2,801,263

PROCESS FOR PRODUCTION OF α,ω-DICARBOXYLIC ACIDS AND ESTERS

Robert H. Hasek and Edward U. Elam, Kingsport, Tenn., assignors to Eastman Kodak Company, Rochester, N. Y., a corporation of New Jersey No Drawing. Application June 18, 1953,
Serial No. 362,674

7 Claims. (Cl. 260—485)

This invention relates to the production of a α,ω-dibasic acids by addition of carbon monoxide and water to unsaturated acids, and of esters of α,ω-dibasic acids by addition of carbon monoxide and a monohydric alcohol to an ester of an unsaturated acid.

The addition of carbon monoxide to certain organic compounds under a variety of conditions and under the influence of a large number of different catalysts has been described under the term "carbonylation," or preferably "carboxylation." Although carboxylation has been applied to many different types of organic compounds— olefins, alcohols, and ethers particularly—the reaction most pertinent to the present invention is the carboxylation of olefins and their derivatives. The addition of carbon monoxide and water to an olefin results in the formation of a carboxylic acid (I).

(I) $\quad CH_2=CH_2 + CO + H_2O \rightarrow CH_3CH_2CO_2H$ if a monohydric alcohol is used in place of the water, the product is the corresponding ester (II).

(II) $\quad CH_2=CH_2 + CO + ROH \rightarrow CH_3CH_2CO_2R$

Carboxylation of a suitable derivative of an olefin, such as an unsaturated alcohol or an unsaturated acid, will yield the corresponding derivative of a saturated carboxylic acid, such as a hydroxy acid (which may spontaneously form a lactone) or a dibasic acid. If the carboxylation is conducted in the presence of an alcohol, the corresponding ester is produced. According to the literature, therefore, the ester of an unsaturated carboxylic acid in which the double bond is spaced from the terminal carbon atom by at least one intermediate carbon atom is reported to be carboxylated in the expected manner (III).

(III)

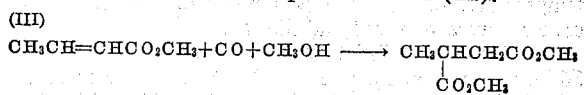

Although many different catalysts have been used to promote the carboxylation reaction, particular interest is centered in the use of metals of the eighth group of the periodic table which form metal carbonyls. Although the metal carbonyl or a closely related derivative appears to be the essential catalyst, it is possible to use the metal itself, suitably in a finely divided active form, or salts of the metal, since under the high pressures and temperatures attending the carboxylation reaction, these latter forms of the metal are converted, at least in part, to the metal carbonyls which catalyze the carboxylation reaction. The best known catalysts are nickel, cobalt, and iron and their derivatives; to a smaller extent, the heavier metals, such as ruthenium, have been used. The action of these catalysts and the mechanism of the carboxylation reaction are highly conjectural at the present time. Before the unusual aspects of this present invention are described, the status of the art should be set forth in detail, particularly in the application of the carboxylation reaction to esters of unsaturated acids.

The prior art on carboxylation of olefins teaches that in an unsymmetrical olefin (RCH=CHR', where R and R' are different groups), the product of carboxylation is a mixture of two products, produced by carboxylation of one or the other unsaturated carbon atoms (IV).

(IV)

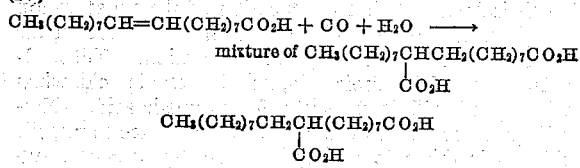

The fact that the carboxylation of oleic acid really produces a mixture of 2-octyl-1,9-nonanedicarboxylic acid and α-nonylsebacic acid, has not, to our knowledge, been rigorously proved; such proof would be difficult to establish. However, the carboxylation of an unsaturated ester of lower molecular weight has been investigated in detail, and its has been reported that only one isomer is obtained; i. e., in the carboxylation of esters of crotonic acid (CH₃CH:CHCOOH) the carboxyl group is added to the β-carbon atom as in (III), according to the literature. In the subsequent description of this invention we will show that this conclusion is wrong, but that the carboxylation of an unsaturated acid or a derivative of such acid does not occur at the expected position in the molecule, and that a true evaluation of the carboxylation reaction provides a method for the preparation of valuable products in an unexpected manner.

An object of this invention is to provide a method of preparing α,ω-dicarboxylic acids and their derivatives. We have found that this object is accomplished by the "carboxylation" of unsaturated monobasic acids and their derivatives, that is, by the addition of carbon monoxide and water or a monohydric alcohol, under the influence of a metal of the eighth group of the periodic table or a salt or carbonyl of said metal.

In the discussion of the prior art on the carboxylation of unsaturated acids and esters, it was pointed out that assumptions have been made that a mixture of products is obtained; furthermore, detailed investigation of unsaturated esters of conveniently low molecular weight has been reported as showing that carboxylation of an ester of an α,β-unsaturated acid takes place only on the β-carbon atom. The course of the present invention shows that this is not the case at all, but that a rearrangement takes place in the carboxylation reaction, whereby only a part of the carboxylation takes place at the expected position, the major reaction being carboxylation of the terminal carbon atom most distant from the carbalkoxy group of the original unsaturated ester. The carboxylation of methyl crotonate in methanol, therefore, has been found to yield only minor amounts of the dimethyl ester of pyrotartaric acid, contrary to prior reports that this is the sole product, and to yield the dimethyl ester of glutaric acid (V) as the major product.

(V) $\quad CH_3CH=CHCO_2CH_3 + CO + CH_3OH \rightarrow$
$\qquad CH_3O_2CCH_2CH_2CH_2CO_2CH_3$ Furthermore, this unexpected rearrangement and carboxylation of a terminal carbon atom also takes place with unsaturated acids as well as with esters of higher molecular weight, although only in the case of the reaction of esters does the carboxylation of the terminal carbon atom appear to be the principal reaction. For example, in the carboxylation of 2-pentenoic acid, adipic acid (VI) is formed, although not as the major product.

(VI) $\quad CH_3CH_2CH=CHCO_2H + CO + H_2O \rightarrow$
$\qquad HO_2CCH_2CH_2CH_2CH_2CO_2H +$
$\qquad CH_3CH_2CH(CO_2H)CHCO_2H$ The course of this reaction with esters is generically illustrated by the general equation (VII).

(VII) $CH_3(CH_2)_mCH=CH(CH_2)_nCO_2R +$
$CO + ROH \rightarrow RO_2C(CH_2)_{m+n+2}CO_2R$ where $m$ is 0 or an integral number, $n$ is 0 or an integral number, and R is hydrogen or an alkyl group, particularly a lower alkyl group (1–4 carbons).

From inspection of this general statement of the invention, it is apparent that the location of the unsaturation in a given unsaturated acid or ester has no effect on the end result of the carboxylation reaction. Thus, 2-hexenoic acid, 3-hexenoic acid, and 4-hexenoic acid, when carboxylated, will, in each case, form pimelic acid. (Naturally, 5-hexenoic acid will also be carboxylated to pimelic acid, but in this case no migration occurs and the result is not unexpected, in view of the prior art in the subject.)

In the use of esters of unsaturated acids, the alkyl group of the alcohol portion of the ester may be any suitable group which is inert toward carboxylation and which does not interfere with the carboxylation reaction. Esters formed from unsaturated acids with alcohols, such as methanol, ethanol, isopropyl alcohol, butyl alcohols, cyclohexanol, etc., are suitable for the carboxylation reaction. It is desirable to use the alcohol corresponding to the alcohol of the unsaturated ester in the preparation of esters of dibasic acids by carboxylation; otherwise, an unduly complicated mixture of esters is produced.

Suitable catalysts for the carboxylation reaction include metals of the eighth group of the periodic table, their salts and their carbonyls and carbonyl derivatives. The metals themselves are used in the form of finely divided catalytically active particles, with or without the inclusion of an inert supporting agent. Such forms include well-known hydrogenation catalysts, such as reduced oxides or carbonates, or Raney and foraminate catalysts prepared by leaching with alkali an alloy of the eighth group metal and an alkali-soluble metal (aluminum or silicon). Representative examples of metal catalysts are reduced cobalt oxide; a Fischer-Tropsch catalyst from reduction of a mixture of cobalt carbonate, thorium carbonate, magnesium carbonate, and kieselguhr; Raney nickel and Raney cobalt. These metals may also be used in the form of salts, such as nickel acetate, cobalt acetate tetrahydrate, nickel carbonate, cobalt acetylacetonate, etc. Particularly suitable as carboxylation catalysts are the carbonyls of these metals, such as nickel tetracarbonyl, dicobalt octacarbonyl, iron pentacarbonyl, the complex, $Co_2(CO)_5 \cdot CH_3OH$, of cobalt carbonyl and methanol, and the complexes with alcohols such as butanol. Cobalt tetracarbonyl has been used in the following examples because of its availability.

The carboxylation reaction is conducted at elevated temperatures and pressures, at 100–350° and under carbon monoxide pressures ranging from 500 p. s. i. upwards. To insure a practical rate of reaction, the carbon monoxide pressure should be in excess of 2500 p. s. i.; even higher pressures are desirable and are limited only by the mechanical strength of the reaction vessel. The reaction is best conducted at 200–250° C. to obtain a rapid reaction rate without excessive formation of by-products. The most suitable temperatures and pressures, of course, will vary with the nature of the reactants.

The practice of the invention is illustrated by the following examples:

Example 1

Methyl crotonate (252 g.), methanol (250 g.) and cobalt tetracarbonyl (10 g.) were placed in a 1680-cc. stainless steel rocking-type autoclave. The autoclave was flushed and then pressured with carbon monoxide to 3300 p. s. i. The autoclave was then heated to 216° C. (5500 p. s. i. pressure), and thereafter maintained at 192–202° C. for 24 hours. During this time, the pressure in the autoclave fell from 5275 to 4200 p. s. i. The autoclave was cooled to room temperature, the pressure was released and the liquid contents were removed and filtered. The filtrate was distilled through a 1.5-inch diameter by 36-inch packed column at 9:1 reflux ratio. The distillate, after removal of the low-boiling solvent and by-products, was collected as the following fractions:

| No. | Boiling Range | Weight, g. | $n_D^{20}$ |
|---|---|---|---|
| 3 | 65–70° C. (4.3 mm.) | 8.3 | 1.4208 |
| 4 | 70–75° C. (4.3 mm.) | 53.1 | 1.4222 |
| 5 | 75–80° C. (4.3–4.8 mm.) | 38.8 | 1.4230 |
| 6 | 80–85° C. (4.8–6.0 mm.) | 37.7 | 1.4235 |
| 7 | 85–86° C. (6.0–5.5 mm.) | 53.7 | 1.4243 |
| 8 | 86–88° C. (6.0 mm.) | 53.7 | 1.4250 |
| 9 | 88° C. (6.0 mm.) | 19.9 | 1.4250 |

Analysis of these fractions by infrared absorption spectroscopy indicated that the ratio of methyl pyrotartrate: methyl glutarate formed in the reaction was 1:2.35.

Fractions 4 and 8, which represent breaks in the distillation curve, were taken for identification purposes. Esters were saponified to obtain the free acids and dianilides were prepared according to the procedure of D. V. N. Hardy (J. Chem. Soc., 358, 1936). Glutaric acid (Eastman Organic Chemicals No. 564) and pyrotartaric acid (prepared by the procedure of Organic Syntheses, vol. 26, p. 54, 1946) were used as reference compounds.

Comparisons of Fractions 4 and 8 with the authentic reference compounds were made as follows:

| Compound | Refractive Index, $n_D^{20}$ | Free Acid, M. P., °C. | Dianilide, M. P., °C. |
|---|---|---|---|
| 1. Fraction 4 | 1.4222 | 108–111 | |
| 2. Dimethyl pyrotartrate | 1.4191 | 110–112 | 199–202 |
| 3. Mixture (1) and (2) | | 109–111 | |
| 4. Fraction 8 | 1.4250 | 92–97 | 227–230 |
| 5. Dimethyl glutarate | 1.4246 | 93–96 | 227–230 |
| 6. Mixture (4) and (5) | | 91–96 | 227–232 |
| 7. Mixture (2) and (4) | | | 184–205 |

Example 2

Ethyl 2-pentenoate (264 g.), ethanol (250 ml.), and cobalt tetracarbonyl (10 g.) were placed in a 1680-cc. stainless steel rocking-type autoclave. The autoclave was flushed and then pressured with carbon monoxide to 3100 p. s. i. The autoclave was then heated to 214° and thereafter maintained at 194–202° for 25 hours. During this time, the pressure in the autoclave fell from 4850 p. s. i. to 4200 p. s. i. The autoclave was cooled to room temperature, the pressure was released, and the liquid contents were removed and filtered.

The filtrate was distilled through a 1.5-in. diameter by 36-in. packed column at 9:1 reflux ratio. The yield of mixed diethyl esters of $C_6$ dicarboxylic acids boiling between 85° (5.5 mm.) and 103° (4.5 mm.) was 245 g. (58.8%). Analysis of this material by infrared absorption spectroscopy indicated that the ratio of ethyl ethylsuccinate:ethyl α-methylglutarate:ethyl adipate in the mixture lay between the limits 2:3:4 and 2:2:3, showing terminal carbon atom carboxylation as the principal single reaction.

The mixed esters were redistilled through an 8-ft. spinning-band column at 40:1 reflux ratio and the following fractions were received:

| Boiling Range, °C. | Pressure Range mm. | Refractive Index Range, $n_D^{20}$ |
|---|---|---|
| 104–106.5 | 8.6–8.5 | 1.4233 |
| 105.5–109.5 | 8.5–8.4 | 1.4237–1.4242 |
| 118–118.5 | 8.4–8.2 | 1.4273–1.4275 |

Three cuts (D, H, and N) were taken, each from the center of one of the above fractions, for identification purposes. Esters were saponified to obtain the free acids, and dianilides were prepared according to the procedure of D. V. M. Hardy (J. Chem. Soc., 398, 1936). Reference compounds were:

| Compound | Source |
|---|---|
| Diethyl ethylsuccinate | Hydrogenation of diethyl ethylidenesuccinate.[1] |
| Diethyl α-methylglutarate | Esterification of α-methylglutaric acid.[2] |
| Diethyl adipate | Commercial.[3] |

[1] Kloetzel, J. Am. Chem. Soc., 70, 3574 (1948).
[2] Wislicenus, Ann., 233, 113 (1886).
[3] Eastman Organic Chemicals, No. 1066.

Comparisons of cuts D, H, and N with authentic reference compounds were made as follows:

| Compound | Refractive Index, $n_D^{20}$ | Free Acid, M. P., °C. | Dianilide, M. P., °C. |
|---|---|---|---|
| 1. Cut D | 1.4233 | 97–8 | [1] 209–11 |
| 2. Diethyl ethylsuccinate | 1.4228 | [2] 100 | [1] 211–14 |
| 3. Mixture (1) and (2) | | | [1] 209–12 |
| 4. Cut H | 1.4241 | 74–6 | 178–80 |
| 5. Diethyl α-methylglutarate | 1.4238 | 74–6 | 179–81 |
| 6. Mixture (4) and (5) | | 74–6 | 178–80 |
| 7. Cut N | 1.4275 | 149–53 | 242–4 |
| 8. Diethyl adipate | 1.4270 | 149–53 | 242–4 |
| 9. Mixture (7) and (8) | | 148–51 | 242–5 |

[1] Changed form with some melting at 190° C.
[2] Value reported in literature.

In this case, carboxylation took place at three positions: (1) without rearrangement, (2) with rearrangement to the neighboring carbon atom, and (3) with complete rearrangement to the terminal carbon atom.

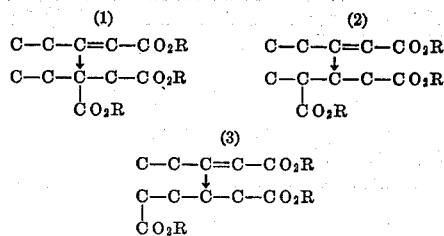

A careful fractionation was made of the mixture of esters produced by this carboxylation of ethyl pentenoate, and each fraction was analyzed by infrared transmission spectroscopy to determine the ratio of diethyl α-ethylsuccinate (1)/diethyl α-methylglutarate (2)/diethyl adipate (3). A summary of the analyses indicated this ratio was between 2/2/3 and 2/3/4.

It is interesting to note that the presence of the ester group apparently exerts considerable influence upon the course of the reaction, for the terminal atom carboxylation does not take place to a similar extent when an acid is reacted, as shown by the following examples.

*Example 3*

A solution of 209 g. of methyl 4-methyl-2-pentenoate and 10 g. of cobalt tetracarbonyl in 250 g. of methanol was treated with carbon monoxide at 4400–3900 p. s. i. and 200° C. for 6 hours. The product was distilled to remove low-boiling materials, cobalt carbonyl decomposition products were filtered off, and the filtrate was fractionated through an 8-ft. spinning band column at 40:1 reflux ratio. The fraction boiling at 109–112° C. (10.3–10.8 mm.), $n_D^{20}$ 1.4329, was refluxed overnight with 20 cc. of aqueous sodium hydroxide solution. The solution was acidified, evaporated to dryness, and the solid residue was extracted with ether. Evaporation of the ether extract left a white crystalline solid, M. P. 83–93° C. After three recrystallizations from a benzene-chloroform mixture, the M. P. was 93–94° C., and the mixed melting point with authentic β-methyl-adipic acid (M. P. 95–98° C.) was 93–97° C. The dianilide, M. P. 202–203° C., was identical with the dianilide of β-methyl adipic acid (mixed M. P. 202–205° C.) but not with the dianilide of α,α-dimethyl glutaric acid (mixed M. P. 173–200° C.).

*Example 4*

A mixture of 430 g. of crotonic acid, 150 cc. of water, and 25 g. of cobalt tetracarbonyl was placed in a 1 l. silver-lined rocking autoclave. The autoclave was then pressured with carbon monoxide to 1800 p. s. i. heated to 200–220°, and sufficient carbon monoxide was added to raise the pressure and maintain it at 12,000–12,400 p. s. i. for six hours. The autoclave was then cooled to room temperature, the pressure was released, and the liquid content removed and filtered.

The filtrate was dehydrated by adding 250 cc. of toluene and removing the water as the azeotrope. The dry solution was decanted from a small amount of solid, added to a mixture of 3 l. of ethylene dichloride, 960 g. of methanol, and 30 cc. of concentrated sulfuric acid, and refluxed for twenty-two hours. The product separated into two layers on cooling. The organic layer was washed free of acid with saturated sodium bicarbonate solution. The solvent was then removed by distillation at atmospheric pressure until the vapor temperature reached 125°.

The residue was distilled at 5 mm. through a short packed column. The main portion of the distillate from this distillation boiled between 65° and 85° (5 mm.) and weighed 279 g.; in addition, 4 g. of material boiling from 85–90° (5 mm.) and 27.0 g. of residue were present.

Analysis of the main fraction by infrared absorption spectroscopy indicated that the ratio of methyl pyrotartrate:methyl glutarate present in the mixture was 5:4.

*Example 5*

A mixture of 344 g. of crotonic acid, 750 cc. of methanol and 10 g. of cobalt tetracarbonyl was placed in a 1680-cc. stainless steel rocking autoclave. Carbon monoxide was pressed into the autoclave to 3000 p. s. i. and the autoclave was heated at 250° C. for 24 hours. During this time the pressure dropped from 6000 to 5200 p. s. i. The autoclave was cooled and the reaction mixture was removed and filtered. The filtrate was refluxed for 60 hours with 1200 cc. of ethylene dichloride and 12 cc. of concentrated sulfuric acid to convert any unesterified acids to methyl esters. The esterification solution was cooled, washed with sodium bicarbonate solution, dried over sodium sulfate and distilled through a packed column. After removal of solvent and other low-boiling materials, the following fractions were collected:

| Boiling Range (4 mm.), °C. | Volume, cc. | $n_D^{20}$ |
|---|---|---|
| 65–68 | 50.0 | 1.4202 |
| 68 | 50.0 | 1.4198 |
| 68 | 50.0 | 1.4198 |
| 68–70 | 10.5 | 1.4228 |
| 70–71.5 | 50.0 | 1.4248 |
| 71.5–72 | 48.0 | 1.4251 |

On the basis of these data, the ratio of dimethyl pyrotartrate to dimethyl glutarate was approximately 3 to 2.

The following example demonstrates that there is no mass action effect in the carboxylation of crotonate esters; i. e., the presence of a substantial amount of dimethyl glutarate in the mixture of reactants did not inhibit the formation of more dimethyl glutarate.

*Example 6*

A mixture of 252 g. of methyl crotonate, 160 g. of dimethyl glutarate, 250 g. of methanol and 10 g. of cobalt tetracarbonyl was heated at 200° C. for 21 hours under a pressure of 4700–3535 p. s. i. of carbon monoxide. The product was worked up in the manner of Example 1. The following fractions were collected:

| Boiling Range (4 mm.), °C. | Weight, g. | $n_D^{20}$ |
|---|---|---|
| 34–62.5 | 15 | 1.4222 |
| 62.5–65 | 32 | 1.4202 |
| 65–70 | 10 | 1.4209 |
| 70–75 | 12 | 1.4247 |
| 75–78 | 272 | 1.4247 |

Analysis of fractions by infrared absorption spectroscopy and correction for the amount of dimethyl glutarate charged with the reactants indicated that dimethyl pyrotartrate and dimethyl glutarate were formed in the ratio of 1 to 3.1.

While terminal carbon atom carboxylation took place to a lesser extent than carboxylation at the original location of the double bond in these cases, the fact that part of the product is methyl glutarate is unexpected in view of the prior art.

This invention represents a new process for the preparation of α,ω-dibasic acids and esters. It makes possible the synthesis of valuable materials useful as plasticizers and as intermediates in the production of polyamides and polyesters, from readily obtainable unsaturated acids and esters. The unexpected rearrangement involved in this invention allows the use of α,β-unsaturated acids and esters as raw materials for the production of α,ω-dibasic acids and esters. The practical advantage of this invention lies in the elimination of the requirement that a terminally unsaturated acid be used as the raw material; such unsaturated acids with a chain length greater than three carbon atoms are exceedingly expensive and difficult to prepare. α,β-Unsaturated acids, on the other hand, can be produced easily and within a practical cost range.

We claim:

1. A process for preparing predominant yields of an α,ω-dibasic acid lower alkyl ester, comprising reacting an unsaturated acyclic carboxylic acid ester of the formula $CH_3(CH_2)_mCH=CH(CH_2)_nCO_2R$, where $m$ and $n$ are selected from 0–4 such that $m+n$ is 0–4 and R is lower alkyl, with carbon monoxide and R'OH, where R' is selected from hydrogen and lower alkyl, in the presence of a substantial amount of said α,ω-dibasic acid lower alkyl ester at about 100–350° C. and about 500–12,400 p. s. i. and in the presence of a catalyst selected from the group consisting of cobalt metal, cobalt salt of organic carboxylic acids, cobalt carbonyls, and cobalt carbonyl derivatives to obtain migration of the double bond in said unsaturated acyclic carboxylic acid ester and to produce a substantial yield of said α,ω-dibasic acid lower alkyl ester from said unsaturated acyclic carboxylic acid ester.

2. A process according to claim 1, wherein R' is lower alkyl.

3. A process according to claim 1, wherein R and R' represent the same lower alkyl group.

4. A process according to claim 1, wherein the starting ester is methyl crotonate.

5. A process according to claim 1, wherein the starting ester is methyl crotonate, R'OH is methanol, and the reaction is carried out at about 192–216° C. and about 3,300–5,500 p. s. i.

6. A process according to claim 1, wherein the starting ester is ethyl 2-pentenoate.

7. A process according to claim 1, wherein the starting ester is ethyl 2-pentenoate, R'OH is ethanol, and the reaction is carried out at about 194–214° C. and about 3,100–4,850 p. s. i.

References Cited in the file of this patent

UNITED STATES PATENTS

| 2,372,090 | Kirkpatrick | Mar. 20, 1945 |
| 2,542,767 | Gresham | Feb. 20, 1951 |
| 2,604,490 | Reppe | July 22, 1952 |
| 2,686,200 | LoCicero | Aug. 10, 1954 |

OTHER REFERENCES

Copenhaver et al.: Acetylene & Carbon Monoxide Chem. (1949), Rheinhold p. 269.

Natta et al.: Gazz. Chem. Ital. 80 (1950) 697–701.